United States Patent [19]

Brand et al.

[11] 4,136,580

[45] Jan. 30, 1979

[54] POWER BRANCHING TRANSMISSION

[75] Inventors: Wilhelm Brand, Hanover; Manfred Dienst, Burgdorf; Adolf Herbert; Gunther Henjes, both of Hanover, all of Fed. Rep. of Germany

[73] Assignee: Hermann Berstorff Maschinenbau GmbH, Hanover Kleefeld, Fed. Rep. of Germany

[21] Appl. No.: 807,125

[22] Filed: Jun. 16, 1977

[30] Foreign Application Priority Data

Jun. 24, 1976 [DE] Fed. Rep. of Germany ....... 2628387

[51] Int. Cl.² ............................................. F16K 37/06
[52] U.S. Cl. .......................... 74/665 GA; 74/665 N; 74/410
[58] Field of Search ......... 74/665 F, 665 G, 665 GA, 74/665 GB, 665 GC, 665 GD, 665 S, 665 L, 665 M, 665 N, 410

[56] References Cited
U.S. PATENT DOCUMENTS

| | | | |
|---|---|---|---|
| 2,186,522 | 1/1940 | Ditges | 74/665 GD |
| 3,824,875 | 7/1974 | Willert et al. | 74/665 GA |
| 3,888,138 | 6/1975 | Hiersig | 74/665 G |
| 3,969,956 | 7/1976 | Hanslik | 74/665 GD |

Primary Examiner—Lance W. Chandler
Attorney, Agent, or Firm—Donald D. Jeffery

[57] ABSTRACT

A power branching transmission, having two parallel output shafts, each of which carries a rotationally rigidly connected ouptput drive pinion, the output drive pinions being axially offset with respect to one another and each meshing with a respective rotatable ring gear and with a respective central gear wheel disposed in the respective ring gear, a pair of driving pinions rotationally rigidly disposed on parallel drive shafts and each meshing with a respective one of the ring gears and a respective one of the central gear wheels, each of the ring gears and each of the central gear wheels having at least one coaxial race with at least one supporting roller disposed between the races and bracing the respective ring gear and associated central wheel with respect to one another. No housing is required, tooth forces of the ring gears and central gears being accommodated by the supporting rollers and not transmitted to the radial bearings of the input end output shafts.

4 Claims, 9 Drawing Figures

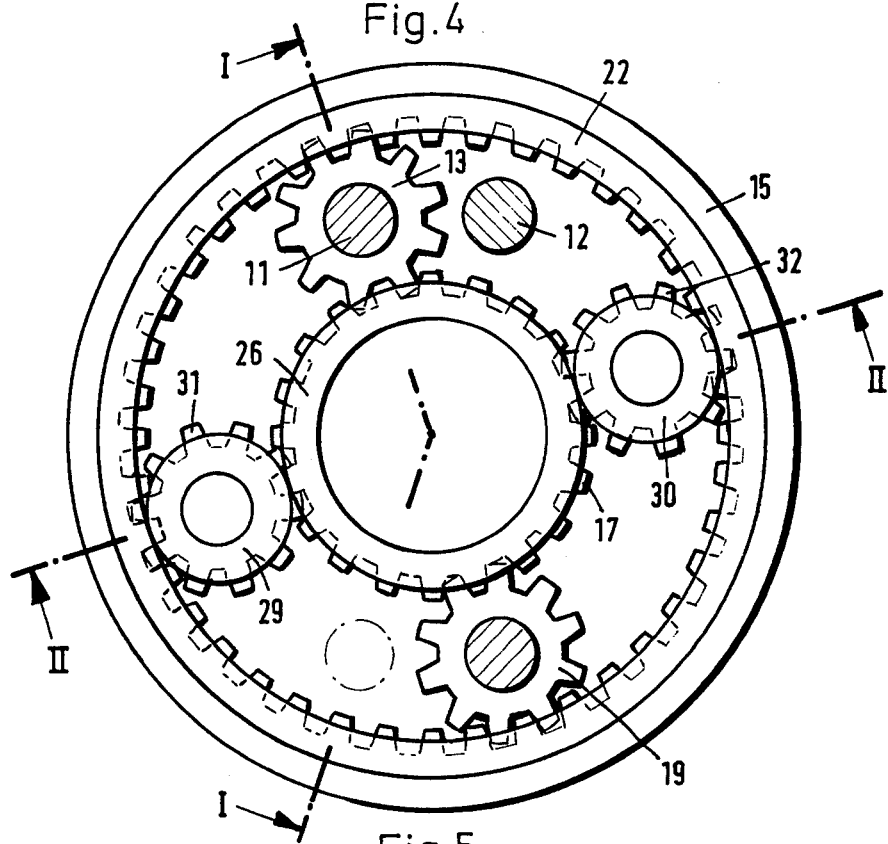
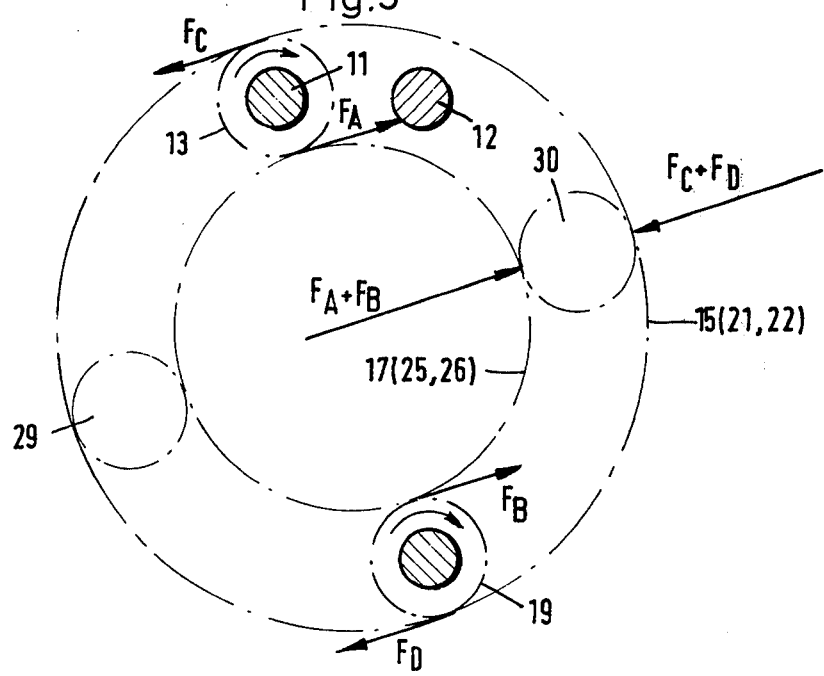

POWER BRANCHING TRANSMISSION

The invention relates to a power branching transmission, particularly though not exclusively for transmitting power to the screws of a double screw extruder.

German Auslegeschrift No. 24 23 905 describes a transmission having, at a small distance from each other, two parallel and oppositely rotating output shafts, each of which carries a driven output pinion rotationally rigidly connected to it. The driven output pinions mesh with respective rotatably mounted mutually axially offset ring gears. Mounted in each ring gear and rotatable in a housing is a central wheel meshing with the respective output pinion and with a driving pinion which likewise meshes with the ring gear. The ring gears and the central wheels are mounted in the housing. By reason of manufacturing tolerances, accurate power branching is not guaranteed with this transmission. The mounting ring gears and central wheels in housing involves a complicated technique.

The invention is based on the problem of providing a power branching transmission which can transmit considerable torques with well balanced power branching.

According to the invention there is provided a power branching transmission, having two parallel output shafts, each of which carries a rotationally rigidly connected output drive pinion, the output drive pinion being axially offset with respect to one another and each meshing with a respective rotatable ring gear and with a respective central gear wheel disposed in the respective ring gear, a pair of driving pinions rotationally rigidly disposed on parallel drive shafts and each meshing with a respective one of the ring gears and a respective one of the central gear wheels, each of the ring gears and each of the central gear wheels having at least one coaxial race with at least one supporting roller disposed between the races and bracing the respective ring gear and associated central wheel with respect to one another.

In such a transmission a housing mounting the ring gears and the central wheels is not required. The supporting rollers accommodate the counteracting tooth forces of the ring gears and the central wheels. No bearing loadings are applied to the radial bearings of the input and output shafts as a result of tooth forces and the output shafts are no longer flexion stressed.

Independently of the inevitable manufacturing tolerances, in the case of the transmission according to the invention, the ring gears and the associated central wheels can adjust themselves automatically so that accurate power branching is guaranteed. The transmission according to the invention is therefore particularly suitable for transmitting high torque levels to closely adjacently disposed shafts such as for example drive shafts for the screws of a double screw extruder.

In order to support the supporting rollers rigidly in the resulting direction of effect of the tooth forces, the diameters of the races of the central wheels and the ring gears are provided to be the same as the pitch circle diameters. In an advantageous further development of the invention, the diameters of the races of the central wheel and ring gear are equal to their pitch circle diameters and in the axial extension, the supporting roller has a system of guide teeth which engage with clearance the respective ring gear and the respective central wheel. The supporting roller or rollers can thus be symmetrically held between the input and output pinions of each ring gear arrangement. Instead of the guide teeth, it is possible to use other guide means.

For example, it is possible, when there are two supporting rollers accommodating the tooth forces in a ring gear arrangment, for only one supporting roller to be provided with guide teeth, the other being articulated on the first by way of an articulating lever.

The invention is diagrammatically illustrated by way of example in the accompanying drawings, in which:

FIG. 4 is an end view taken on line IV—IV of FIG. 1 of the ring gear arrangement;

FIG. 5 is a symbolic representation of the forces obtaining in the ring gear arrangement shown in FIG. 4;

Figure 1:
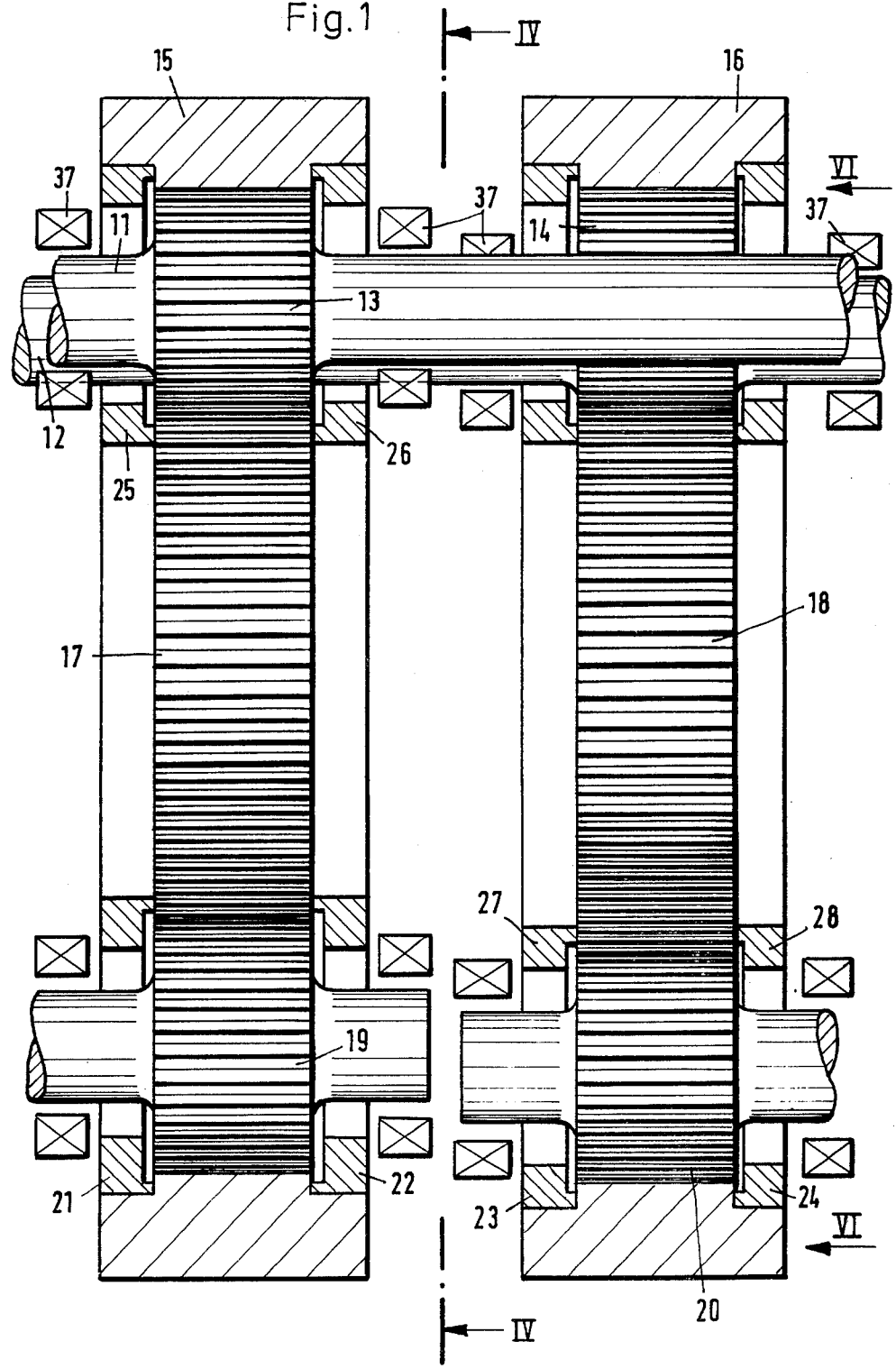
FIG. 1 shows a longitudinal section through one embodiment of a power branching transmission according to the invention taken on line I—I of FIGS. 4 and 6.
Figure 2:
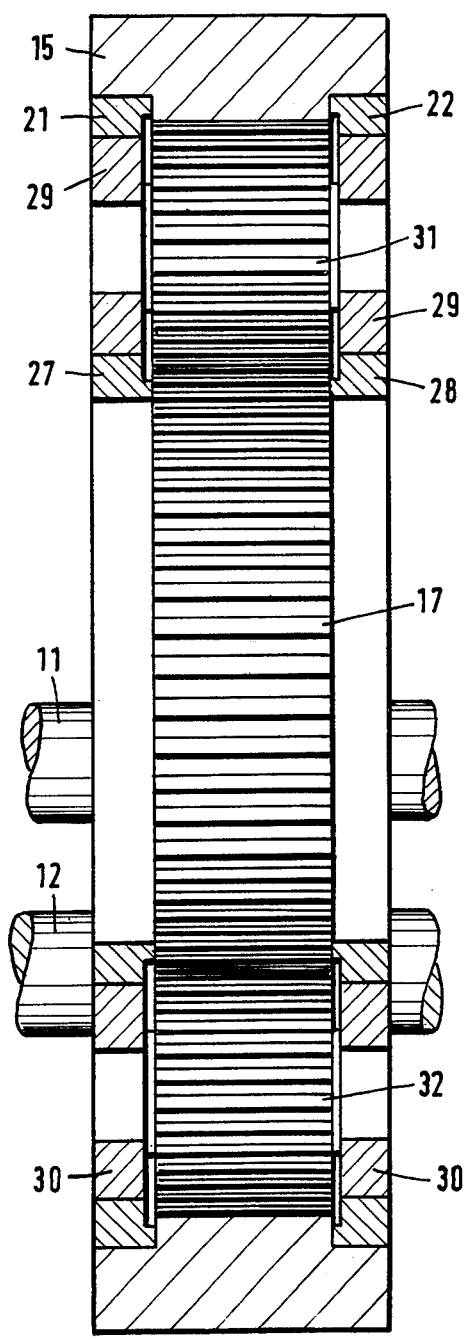
FIG. 2 shows a longitudinal section taken on line II—II of FIG. 4 through a ring gear arrangement.
Figure 3:
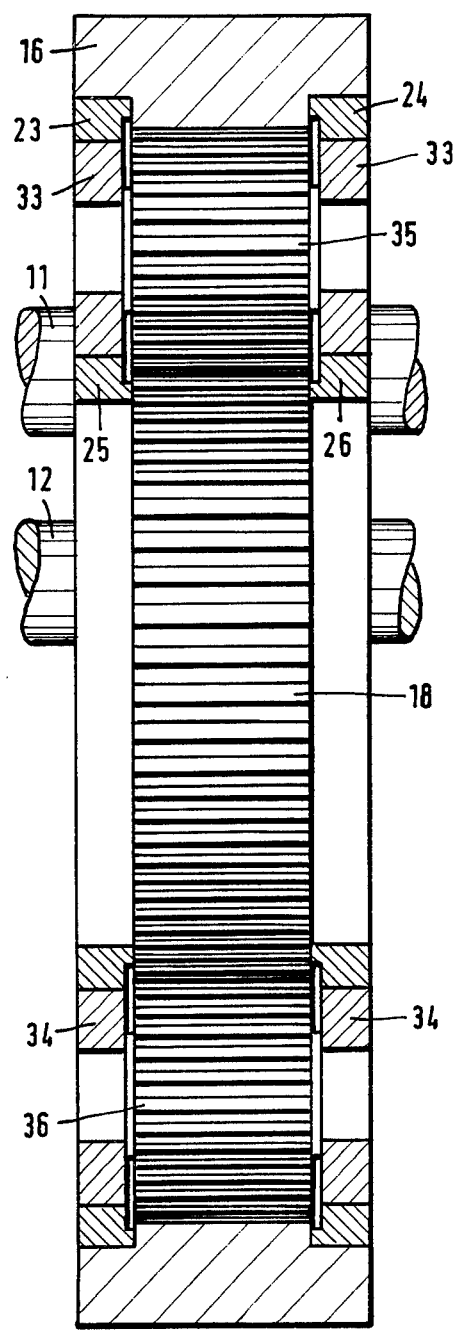
FIG. 3 shows a longitudinal section taken on line III—III of FIG. 6 of the other ring gear arrangement shown in FIG. 6.

Referring to the drawings, parallel output shafts 11 and 12 are disposed at a small distance from one another. The output shafts 11 and 12 carry a respective output pinion 13, 14 which are axially staggered with respect to one another. The output pinions 13 and 14 mesh each with a respective ring gear 15, 16. Concentrically disposed in each ring gear 15, 16 is a central gear wheel 17, 18 which meshes on the one hand with the output pinion 13 or 14 and on the other with a driving pinion 19 or 20 located diametrically opposite the output pinion 13 or 14. The driving pinions 19 and 20 each mesh furthermore with a respective one of the ring gears 15, 16. The drive pinions 19 and 20 are driven in the same direction through intermediate gears 42, 43 and 44, 45 respectively (FIG. 8) and in turn drive the ring gears 15 and 16 and the central gear wheels 17 and 18.

The ring gears 15 and 16 carry on each side a fitted inner race 21, 22 and 23, 24. The central gear wheels 17 and 18 carry on both sides in each case an outer race 25, 26 and 27, 28. The diameter of the inner races 21 to 24 corresponds to the pitch circle diameter of the ring gears 15, 16. The diameter of the outer races 25 to 28 is equal to the pitch diameter of the central gear wheels 17, 18.

Between the inner races 21 and 22 of the first ring gear 15 (FIG. 4) and the outer races 25, 26 of the first central gear wheel 17 run two supporting rollers 29 and 30 having guide teeth 31, 32 which mesh with clearance with the ring gear 15 and the central gear wheel 17.

FIG. 5 is a diagram showing the forces obtaining in this first ring gear arrangement. The supporting roller 30 is disposed symmetrically between the output pinion 13 and the driving pinion 19, between the inner race 22 and the outer race 26 and lies in the direction of action of the resulting tooth forces. The force $F_A$ occurring by reason of the tooth engagement of the ring gear 15 and the output pinion 13 and the force $F_B$ arising by reason of the tooth engagement of ring gear 15 with the driving pinion 19 produce the resultant force $F_A + F_B$, in the direction of action of which the supporting roller 30 is disposed. The force $F_A + F_B$ counteracts a resulting force $F_C + F_D$ which arises out of the tooth engagement of the central gear wheel 17 with the output pinion 13 of the driving pinion 19.

Located diametrically opposite the supporting roller 30 is the supporting roller 29. The supporting roller 29 serves only as a guide means in the direction of rotation shown. Upon a reversal of the direction of rotation, the supporting roller 29 would takeover the supporting of the central gear wheel 17 and the ring gear 15, the supporting roller 30 then only having a guiding function.

Figure 6:
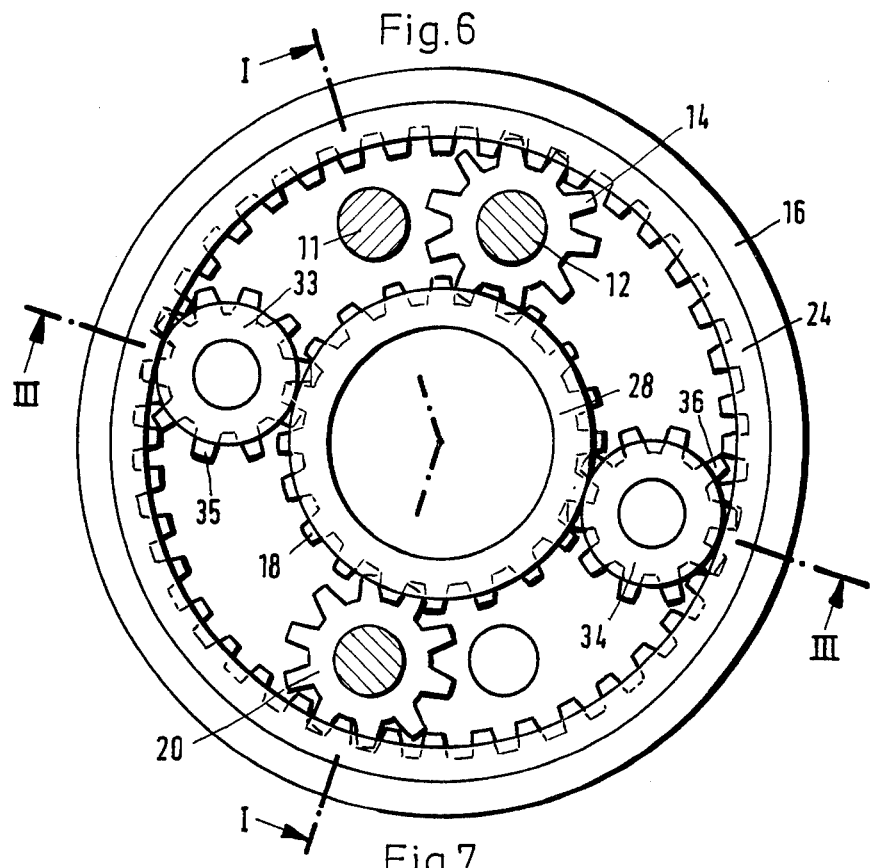
FIG. 6 is an end view taken in the direction of the arrows VI—VI of FIG. 1.
Figure 7:
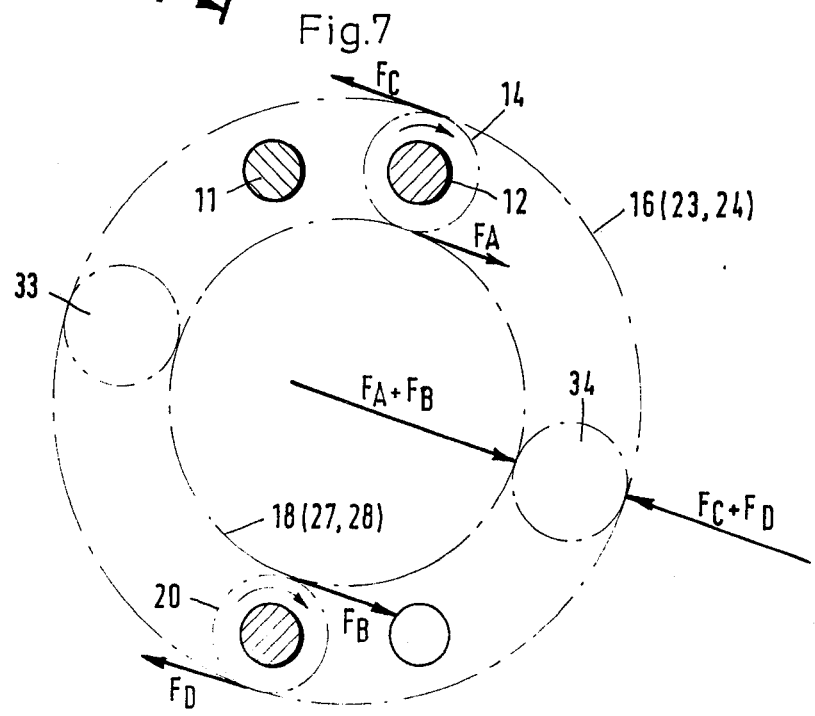
FIG. 7 is a symbolic representation of the forces obtaining in the ring gear arrangement of FIG. 6.

Running between the inner races 23 and 24 of the second ring gear 16 (FIG. 6) and the outer races 27 and 28 of the second central wheel 18 are two supporting rollers 33 and 34, each of which has guide teeth 33, 36 which mesh with clearance with the ring gear 16 and the intermediate wheel 18. The supporting rollers 33 and 34 are diametrically opposite each other. The supporting roller 34 lies symmetrically between the output pinion 14 and the driving pinion 20. The supporting roller 34, as shown in FIG. 7, absorbs the resulting tooth forces. The supporting roller 33 serves for guide purposes. If the direction of rotation was reversed, the supporting roller 33 would accommodate the resulting tooth forces while the supporting roller 34 would only have a guiding function.

Figure 8:
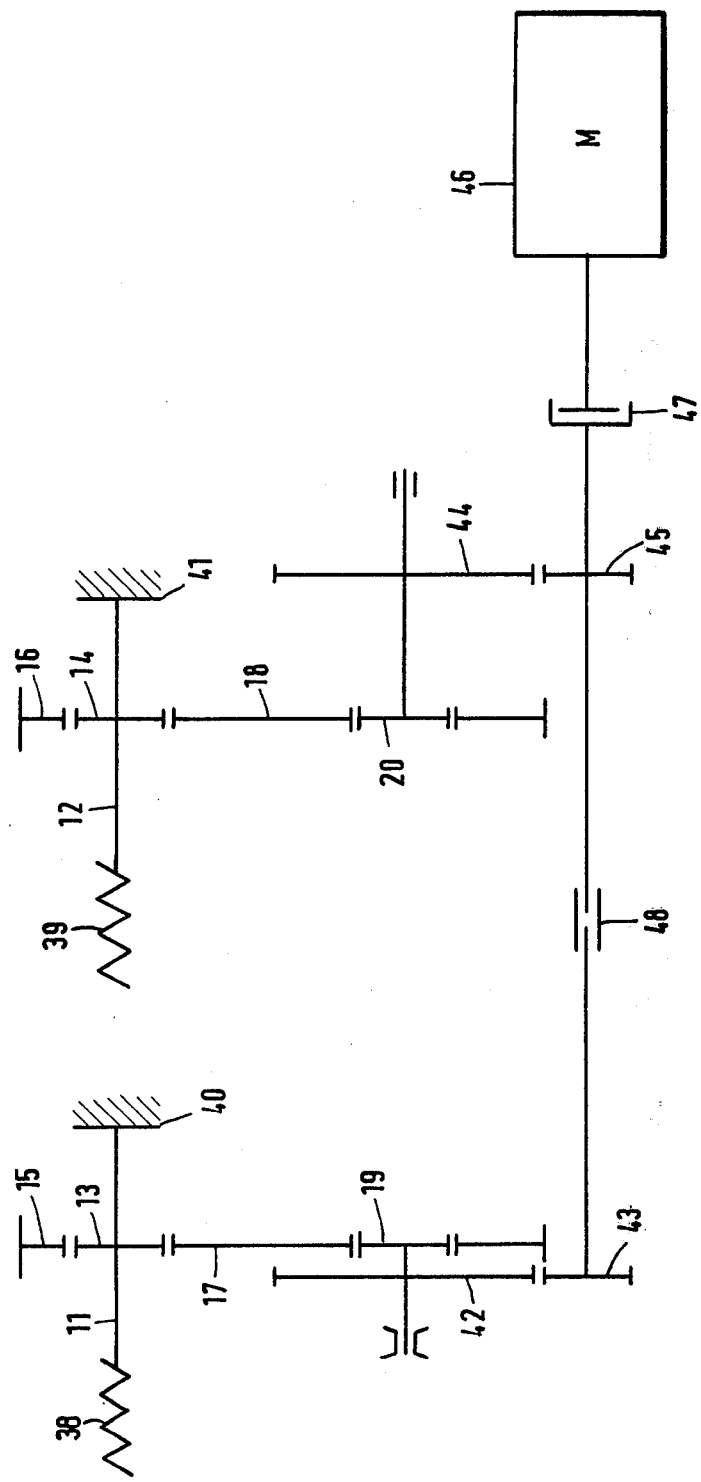
FIG. 8 is a diagram showing the transmission in the embodiment of FIGS. 1 to 7.

The output shafts 11 and 12 are mounted in the transmission housing by radial bearings indicated at 37. The retroacting axial forces of the screws 38 and 39 which are connected to the output shafts 11 and 12 are accommodated by axial thrust bearings 40, 41 (FIG. 8). The driving pinions 19 and 20 are driven in the same direction through the intermediate gear wheels 42, 43 and 44, 45 by a motor 46. Provided between the motor 46 and the first transmission branch 44, 45 is a clutch coupling 47. The output pinions 13, 14 and thus the screws 38, 39 can be synchronised by means of an adjustable coupling 48 between the first transmission branch 44, 45 and the second transmission branch 42, 43.

The ring gears 15, 16 and the associated central gear wheels 17, 18 are braced against each other by the respective supporting rollers. Tooth forces occurring by reason of the meshing engagement are accommodated by the supporting rollers. There are no bearing loadings due to tooth forces. The ring gears and the central gear wheels are automatically adjusted for accurate power branching.

It is also possible to use the transmission according to the invention for contra-rotating output shafts.

Figure 9:
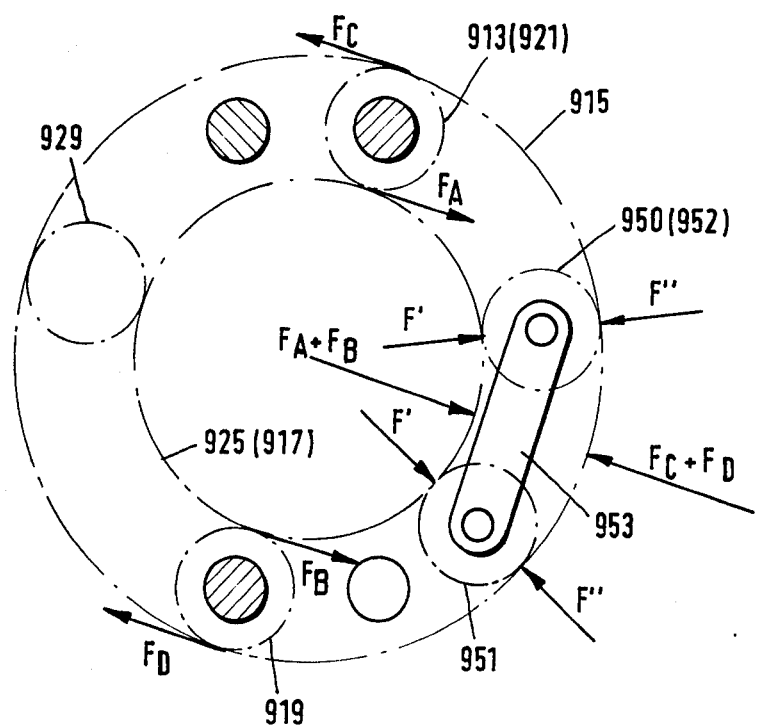
FIG. 9 is a diagrammatic view of the forces obtaining in a modified construction of ring gear arrangement.

A diagrammatic representation of the forces arising in a modified embodiment of ring gear arrangement is shown in FIG. 9. A ring gear 915 is in engagement with a driving pinion 919 and an output pinion 913 both of which mesh with a central gear wheel 917. The diameters of races 921, 925 correspond to the pitch circle diameters of the respective gears 915 and 917. Disposed in the resulting force direction $F_A + F_B$ is a symmetrical supporting roller unit comprising two supporting rollers 950 and 951 of which only the supporting roller 950 has guide teeth 952. The other supporting roller 951 is maintained stationary by an articulated lever 953 which connects it to the first supporting roller 950. The supporting roller diameter is the same as the pitch circle diameter of the guide teeth 952 of the first supporting roller 950.

Tooth forces $F_A$, $F_B$, $F_C$ and $F_D$ arising due to tooth engagements are symmetrically divided and accommodated by the supporting rollers 950 and 951. The ring gear 915 and the central gear wheel 917 are braced in respect of one another through two supporting rollers 950, 951.

A supporting roller 929 which is opposite the supporting roller unit 950, 951 only serves for guidance in what is assumed to be the direction of rotation.

What is claimed is:

1. In power branching transmission, having two parallel output shafts, two output drive pinions rotationally rigidly connected to respective ones of said parallel output shafts, said output drive pinions being axially offset with respect to one another, two rotatable ring gears, two central gear wheels each disposed in a respective one of said rotatable ring gears, said output drive pinions each meshing with a respective one of said ring gears and with a respective one of said central gear wheels, two parallel drive shafts, two driving pinions rotationally rigidly disposed on respective ones of said parallel drive shafts and each meshing with a respective one of said ring gears and a respective one of said central gear wheels, the improvement comprising a coaxial race for each of said ring gears and each of said central gear wheels and a supporting roller for each co-operating pair of said ring gears and said central gear wheels, disposed between said races and bracing respective ones of said ring gears and co-operating central wheels with respect to one another.

2. The invention of claim 1, wherein each of said ring gears has two of said coaxial races and each of said central gear wheels has two of said coaxial races.

3. The invention of claim 1, wherein the diameters of said coaxial races of said central gear wheels and the diameters of said coaxial races of said ring gears are equal to their respective pitch circle diameters, two of said supporting rollers are provided for each co-operating pair of said ring gears and said central gear wheels and each of said supporting rollers, in an axial extension thereof, has guide teeth meshing with clearance with the respective one of said ring gears and the respective one of said central gear wheels.

4. The invention of claim 1, further comprising a supporting roller unit comprising a plurality of said supporting rollers connected articulatingly with one another, only one of said supporting rollers of said supporting roller unit having guide teeth.

* * * * *